Dec. 9, 1969    M. MARTIN    3,482,876
VEHICLE DISCHARGE APPARATUS
Filed Dec. 21, 1967
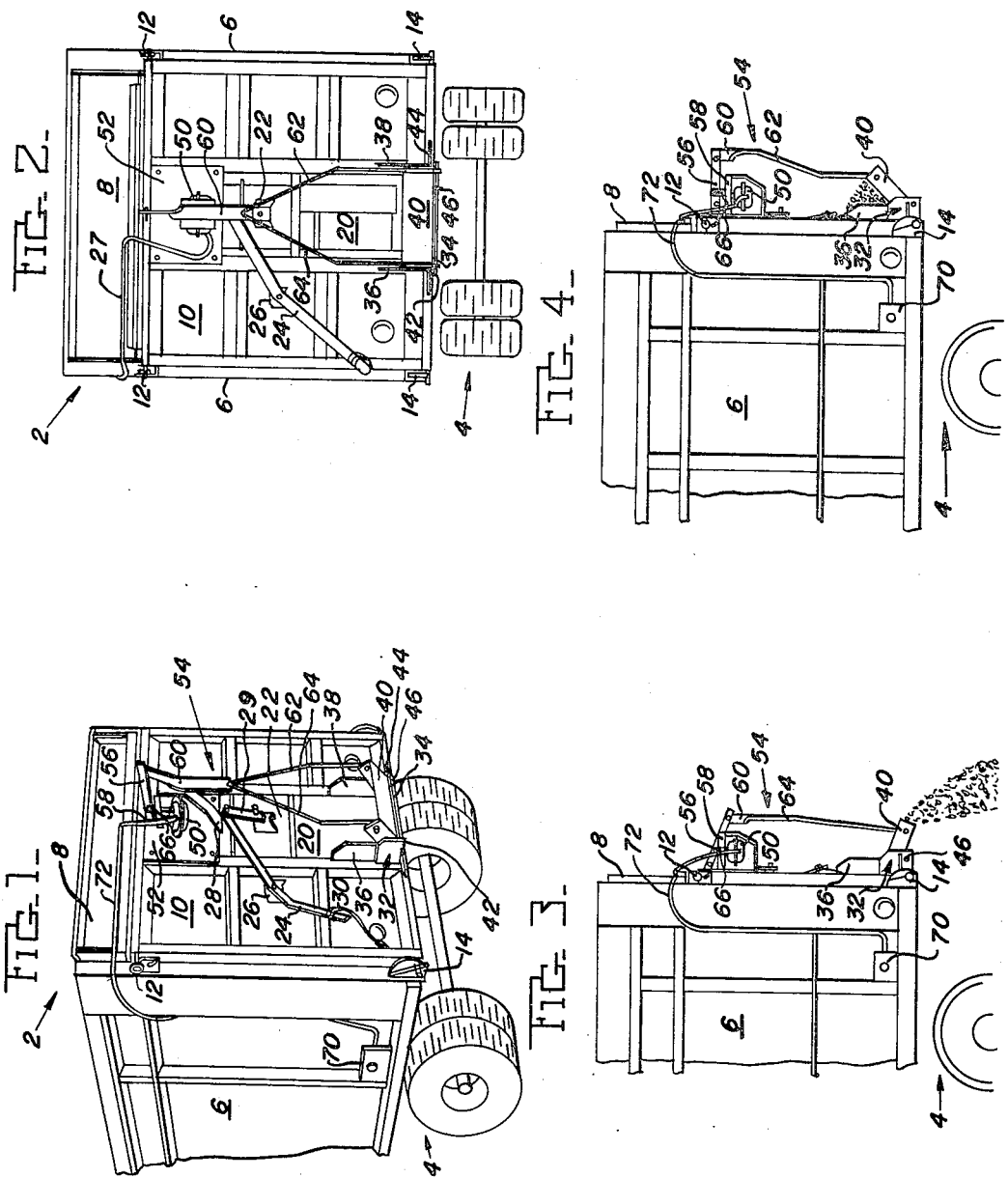
INVENTOR
MARION MARTIN
By Stanley J. Price
his Attorney

United States Patent Office 3,482,876
Patented Dec. 9, 1969

3,482,876
VEHICLE DISCHARGE APPARATUS
Marion Martin, Slippery Rock, Pa., assignor to Tajon, Incorporated, Mercer, Pa., a corporation of Delaware
Filed Dec. 21, 1967, Ser. No. 692,408
Int. Cl. B60p 1/04
U.S. Cl. 298—23                                    1 Claim

ABSTRACT OF THE DISCLOSURE

A material discharge vehicle such as a dump truck bed having a dump box rotatably mounted thereon. The dump box having a floor, a front wall, a rear wall and two connecting lateral walls all cooperating to define a material holding chamber. The rear wall has a discharge opening which is preferably rectangular and disposed toward the bottom thereof. A slidable gate member reciprocates to open and close the discharge opening. Discharge guide means are disposed adjacent the bottom of the discharge opening, secured to the rear wall and extending rearwardly therefrom. The discharge guide means has a rotatable lip member which is adapted to rotate upwardly about a horizontal axis to either reduce or terminate the discharge flow from the material discharge chamber through the discharge opening. Means for rotating the lip member include operating means, linkage means rotating the lip member responsive to operation of the operating means and control means for initiating and terminating function of operating means. The fluid operating means may have air bellows, an air cylinder or an hydraulic cylinder.

BACKGROUND OF THE INVENTION

Field of the invention

This invention relates to apparatus for controlling the discharge of material from a dump truck. Specifically, it relates to apparatus for terminating or reducing discharge of material from an opening in the tailgate of a dump truck.

Description of the prior art

One of the conventional forms of dump truck has a substantially horizontal truck bed upon which is rotatably mounted a tiltable material holding contaner. The rear wall, or a portion of the rear wall, of the material holding container is generally rotatably secured to the rest of the container. In effecting discharge of the material, the material holding container or box is rotated with respect to the truck bed with the forward end moving upwardly and the rearward end moving generally downwardly. The hinged rear wall or tailgate as it is commonly called, rotates with respect to the rest of the box, thereby establishing an opening equivalent to the transverse dimension of the material container and of width dependent upon the degree of rotation of the tailgate with respect to the remainder of the truck box. When the discharge of material has been completed, the material holding container is returned to its original position on the truck box and the discharge gate is closed.

It will be appreciated that such systems provide only limited control over the rate of discharge and size of opening from which the materials are being discharged. Thus, the angle of inclination of the box floor with respect to the truck bed and the extent of opening established by rotation of the tailgate are, as a practical matter, the only two means of flow control.

The tilting of the box with respect to the truck bed is generally controlled by hydraulic means. It is also known to control the rotaation of the tailgate with respect to the box by hydraulic means. The latter type of system is disclosed in U.S. Patent 3,235,310. Thus, the compound hydraulic movements of the truck bed and tailgate provide the means of flow control for such truck systems.

In addition, it has been known to place one or more baffle-type members across portions of the transverse opening established by rotational movement of the tailgate away from the remainder of the truck bed. Such baffle plates are employed where it is desired to discharge material over only limited portions of the transverse opening. Such systems are disclosed in U.S. Patents 1,468,294 and 2,563,736. In Patent 1,468,294, adjustability is effected by a plurality of such baffle plates which are vertically disposed in guide members disposed within the rear wall structure of the truck box and slidably movable with respect to each other. In U.S. Patent 2,563,736, the baffle plate is generally centrally mounted and is adapted to span the gap between the lower portion of the tailgate and the truck box floor.

In addition to illustrating the baffle plate adjustability feature, U.S. Patent 1,468,294 also discloses a composite system for fixing or adjusting the flow rate for a given dumping action. In this system, the tailgate rather than being rotatably mounted wtih respect to the truck body is vertically slidable within channels to provide an opening for the discharge of materials. Operating with this combination of slidable baffles and vertically reciprocating or slidable tailgate member is a rotatable partial floor which may be set at one of a number of positions prior to initiation of dumping. Thus, with the truck body of the type described in the aforementioned patent, the transverse extent of discharge opening may be established by placement of the movable slides and subsequently, prior to dumping the material, the rate of discharge may be controlled by adjusting the angle of inclination and the height of the bottom of the tailgate with respect to the truck body floor. Cables are provided for raising the floor extension and the slidable tailgate. Manual means are provided for transmitting rotation of a control wheel to the winding or unwinding of the cable and responsive upward and downward movement of the tailgate and/or the floor extension. While this system does provide means for estatblishing some control over the transverse area of discharge, as well as the rate of discharge, all of the variables must be set before dumping is initiated. There remains, therefore, the inability to either adjust the rate of flow or terminate flow during dumping, other than through the lowering of the inclined dump truck body.

It has also been known to restrict the extent of discharge area transversely of the truck body by providing openings to limit discharge which effectively restricted discharge flow to the transverse dimension of the opening. Such a system is disclosed in U.S. Patent 1,735,930, wherein a hinged tailgate has a removable, slidable door which occupies but a small fraction of the entire transverse dimension of the tailgate. Upon removal of the transverse door, discharge will be effected only through the opening thus established. A chute may be attached to the door to further channel discharge into the desired location.

A similar disclosure is contained in U.S. Patent 1,481,-538 wherein an opening is provided in the rear wall of a dump truck and in this opening, is slidably mounted for vertical reciprocation, a gate adapted to open and close the discharge opening. Secured to the upper portion of the gate is one end of an operating arm which is pivoted at about its mid-point. Movement of the opposed end of the operating arm upward or downward produces responsive downward or upward movement of the gate member, thereby opening or closing the discharge opening. A major disadvantage of such system is the need, when attempting to terminate discharge of material for pushing the door downwardly into closed position against the substantial force of the outwardly flowing discharging material. As a practical matter, termination of flow cannot be accurately effected and spillage as well as exertion of the individual attempting to effect flow termination, results.

Also, with respect to guiding means for the material to be discharged from a limited transverse area, U.S. Patent 2,878,053 discloses sloping inserts which are adapted to be placed on the inside of the truck body in the rear corners in order to serve as baffle plates for deflecting the flowing material transversely inwardly toward the longitudinal center line of the truck body, to thereby cause discharge through a limited portion of the rear wall of the truck bed.

It is thus seen that there is no effective means of providing a limited transverse opening in the rear of a dump truck body and providing effective means for automatically, instantaneously controllably reducing or completely terminating the discharge flow of material from within the truck body. This problem is particularly acute when it is desired to dump a partial load in accurate fashion. Also, the problem attains great importance when it is necessary to dump materials in a space of limited capacity or a container of some sort.

SUMMARY OF THE INVENTION

The above enumerated problems have been effectively solved by the apparatus of this invention. The apparatus of this invention provides a dump truck having a dump box rotatably mounted with respect to the dump truck bed. A discharge opening which is preferably generally rectangular in shape, is disposed within the tailgate or rear wall member and is provided with a slidable gate member for opening and closing the discharge opening. Discharge guide means are provided adjacent the bottom of the discharge opening, secured to the rear wall and extending rearwardly therefrom. The discharge means has a rotatable lip portion which is adapted to be rotated about a horizontal axis and assume a downward position for full material discharge flow, an upwardly rotated position for termination of material discharge flow and intermediate positions for reduced rates of discharge flow. Means for automatically rotating the lip member are mounted on the truck body. These means have control means for initiating operation of the device, fluid operating means such as an air bellows or hydraulic cylinder mounted on the rear wall of the truck and linkage means connecting the fluid operating means with the rotatable lip to establish movement of the lip responsive to movement of the fluid operating means. It will thus be appreciated, that even during the dumping operation, adjustment of the rate of flow or termination of flow will be readily effected by activation of a control means which may conveniently be mounted on the truck bed adjacent the rear thereof. Thus, there is no need to alter the angle of inclination of the dump box with respect to the truck bed, nor is there any need to attempt to close the gate member against the force of the flowing material.

It is an object of this invention to provide apparatus for effectively controlling and terminating the flow of material discharging from a dump truck.

It is another object of this invention to provide apparatus for mechanically controlling the rate of discharge from a limited discharge opening in a dump truck body and subsequently terminating the flow accurately and without spillage.

It is another object of this invention to provide a system which may be simply and economically introduced into conventional dump trucks having limited discharge openings.

It is yet another object of this invention to provide such apparatus which is adapted to permit the normal functioning of the tailgate to rotate with respect to the box and establish a transverse discharge opening the full width of the truck box.

Other objects and advantages of the invention will be understood from the following description of the invention, on reference to the illustrations appended hereto.

BRIEF DESCRIPTION OF THE DRAWINGS

FIGURE 1 is a perspective view of the rear portion of a dump truck equipped with the apparatus of this invention.

FIGURE 2 is a rear elevational view of a dump truck equipped with the apparatus of this invention.

FIGURE 3 is a left side elevation of the rear portion of a dump truck equipped with the apparatus of this invention illustrating in detail the apparatus of this invention in a material discharging position.

FIGURE 4 is similar to FIGURE 3 but illustrates the invention with the apparatus in position for terminating material discharge flow from the discharge opening.

DESCRIPTION OF THE PREFERRED EMBODIMENTS

Referring now to the drawings in greater detail, with particular reference to FIGURES 1 and 2, there is illustrated a dump truck having a dump box 2 rotatably secured to a truck bed 4. The dump box 2 is defined by a floor member (not shown), a front wall (not shown), two lateral walls 6 and a rear wall 8 which combine to define a material holding chamber. The rear wall 8 has a tailgate 10 rotatably secured to lateral walls 6. Tailgate 10 is rotatably journaled in brackets 12 and is releaseably secured within brackets 14. When it is desired to dump the contents of the material holding chamber across the full transverse width of the tailgate 10, brackets 14 are opened and the tailgate 10 is permitted to rotate about journals or brackets 12. The dump box 2 is then rotated upwardly with respect to the truck bed 4 and the gate is permitted to open, thereby facilitating discharge of the materials.

In instances when it is desired to discharge a limited quantity of material and/or dump material over a limited controlled region, as in the filling of a container, the rear wall 8 is also provided with a discharge opening 20 which in the form shown, is substantially rectanuglar. Discharge opening 20 is disposed toward the lower portion of the rear wall within tailgate 10. A slidable gate 22 is adapted to reciprocate vertically to open and close discharge opening 20. Movement of slidable gate 22 is effected through lever arm 24 which is rotatably secured at pivot 26 and is secured to slidable gate 22 at point 28 through connecting link 29. A force applied downwardly to the free end 30 of lever arm 24 causes slidable gate 22 to move upwardly thereby permitting discharge of material through discharge opening 20. Upward movement of the free end 30 of lever arm 24 causes downward movement of slidable gate 22 for the closing position for the discharge opening 20.

As has been stated above, one of the major problems encountered with discharge openings such as that shown for purposes of illustration, is the difficulty in effectively moving the gate 22 to closed position against the force exerted by the outwardly flowing material. In order to solve this problem, discharge guide means 32 are provided adjacent to the lower portion of discharge opening 20 secured to the rear wall 8 and extending rearwardly therefrom. In the specific form of discharge guide means selected for illustration, the guide means 32 has a discharge channel defined by a bottom wall 34 and opposed side walls 36, 38. Secured to the rear portion of the guide means 32 is a rotatably mounted lip member 40. The lip member 40 has a rearwardly extending free end and is adapted for vertical rotation about a horizontally disposed axis. In the form selected for illustration, the lip member 40 is rotatably secured to side walls 36, 38 at points 42, 44 through rod 46 which is secured to lip member 40.

As is shown in FIGURES 3 and 4, the lip portion 40 is adapted to assume one position generally aligned with the bottom wall 34 of the discharge guide means 32 to facilitate discharge of material and a second position upwardly rotated with respect to the bottom wall 34 to terminate discharge of material. Thus, when the dump box has been tilted, the slidable gate 22 moves to the position opening the discharge opening 20 and the lip member 40 is in its downward position, material will be freely discharged from the material holding chamber. When it is desired to terminate such flow, this may readily be accomplished in an efficient manner by first, upwardly rotating lip member 40 to thereby terminate the discharge flow and subsequently gate 22 may be moved to the closed position. These movements may be precisely coordinated with the downward rotation of the dump box, if desired. It will be appreciated, that in this fashion, there is no need to attempt to lower the gate against the force of outward flowing material. Also, movement of the lip member 40 serves as an effective means of obtaining precise control over the amount of discharged materials. It will be further appreciated, that, should it be desired to reduce the rate of flow, but not fully terminate such flow, this may be readily accomplished by rotating lip member 40 to a position intermediate the full flow position and the position fully terminating discharge.

This invention also provides means for automatic, effectively controlled rotation of the lip member 40. These means comprise control means, operating means which are preferably fluid operating means and linkage means. The operating means for establishing rotational movement of the lip member 40 is preferably mounted on the rear wall 8 of the truck in generally overlying position with respect to the discharge guide means 32. In the form selected for illustration, fluid operating means in the form of an air bellows 50 is secured to rear wall 8 by means of mounting bracket 52. These operating means might also be other fluid means such as an air cylinder or an hydraulic cylinder, for example, or an electric motor. Movement of the air bellows 50 establishes responsive movement of the linkage means 54.

The linkage means 54 has a rigid lever 56 rotatably secured to the rear wall 8 at point 58. This horizontally disposed rigid lever 56 is secured to a vertically disposed rigid lever 60 which depends downwardly. Depending diverging arms 62, 64 are secured to the lower portion of rigid lever 60. (In the form illustrated, arms 62, 64 are integrally formed with rigid lever 60.) The lower portions of arms 62, 64 are rotatably secured to lip member 40. In FIGURE 1 it is seen that the divergence of the arms 62, 64 with respect to each other permits securance of the lower ends of the arms 62, 64 to the lip member 40 on or adjacent the side member of the lip member, thereby effecting a stable support therefor. A connecting arm 66 connects the air bellows 50 with the horizontally disposed rigid lever 56. As the air bellows 50 expands, it exerts an upwardly directed rotational force to rigid lever 56 which in turn raises vertically disposed rigid lever 60 thereby raising depending arms 62, 64. This movement causes upward rotation of lip member 40 to the position shown in FIGURE 4. Upon downward or contracting movement of the air bellows 50, the weight of the linkage means and attached lip member cause downward rotational movement of rigid lever arm 56 and the remainder of the linkage means 54 thereby rotating lip member 40 downwardly to a discharge position.

This invention also provides automatic control means for effectively controlling the operation of the air bellows 50. This control device is preferably mounted on the exterior of the dump box 2 toward the rear thereof. In this position, the operator is able to observe the discharge of material and position of the lip member 40 at the rear of the dump box 2. In the form illustrated, a fluid control valve 70 is secured to lateral wall 6 and is connected with air bellows 50 by an air conduit 72. By suitably positioning the fluid control valve 70, the operator may cause introduction of air into the bellows to establish expansion thereof and withdrawal of the air from the bellows 50 to cause contraction thereof. Thus, the control valve position causes bellows movement which, by means of the linkage means 54 causes responsive vertical rotational movement of lip member 40. In instances where a container is being filled from the dump truck, the operator will be in a position to view the level of material within the container, and responsively control the rate of discharge flow as well as the termination thereof in an automatic fashion at the appropriate time. There is no need to attempt to restore the slidable gate 22 to the gate closed position against the force of the flowing material. Also, as a result of the use of the discharge opening 20, the extent of transverse opening for discharge of material is effectively limited. The air supply means, or in the event of the use of a hydraulic cylinder, the hydraulic fluid supply means may be any conventional system providing a source of the fluid and pumping means for moving the fluid in the desired direction through conduit 72.

It will be appreciated, therefore, that this invention provides an effective means of simply modifying a conventional dump truck structure having a discharge opening 20 within the rear wall. The discharge opening is generally preferably disposed in the lower portion of the tailgate 10. By the simple addition of discharge guide means 32 having a rotatable lip member 40 which may be remotely operated and automatically rotated, the problem of termination of flow and discharge of a specific quantity of material are effectively solved. The apparatus is so disposed as to not interfere with the normal tailgate functioning for effecting discharge across the transverse width of the dump box 2 and is adapted to be installed in existing equipment. The controls are preferably positioned so that the operator may view the functioning and position of the rotatable lip 40. By rotating the lip member 40 upwardly to the desired position, flow of material through the discharge guide means is effectively terminated and the gate may be lowered without the need for moving the gate against the force established by the flow of the discharging material.

While, for purposes of illustration, a fluid operated means for establishing rotation of the lip member 40 has been shown, it will be appreciated that other conventional power means such as electric motors, for example, may be employed. It is preferred that the power means are mounted on the rear wall 8 of the dump box 2 and that the controls therefor be positioned so that the operator may view the discharge operation while having access to the controls.

While specific linkage means for connecting the power means with the rotatable lip member 40 have been shown, it will be appreciated that any means for rotating the lip member 40 responsive to movement established by the operating means, fluid or otherwise, may be employed.

While for purposes of illustration a dump vehicle which is a dump truck has been illustrated, it will be appreciated that the invention is applicable to other dump type material discharge equipment such as railroad cars, for example.

Whereas particular embodiments of the invention have been described above for purposes of illustration, it will be apparent to those skilled in the art that numerous variations of the details may be made without departing from the appended claims.

I claim:
1. In a dump vehicle assembly,
   a dump vehicle bed for a dump truck,
   a dump box having a floor, a front wall, a rear wall and two connecting lateral walls defining a material holding chamber,
   said dump box rotatably mounted on said dump vehicle bed,
   said rear wall having a discharge opening disposed toward the bottom thereof, a slidable gate member for opening and closing said discharge opening, a discharge channel disposed adjacent the bottom of said discharge opening secured to said wall having said discharge opening and extending rearwardly therefrom, said discharge channel having a bottom wall and vertical side walls on opposed sides of said bottom wall, a rotatable lip member rotatably secured to said discharge channel and adapted to assume a material discharge position and an upwardly rotated position for termination of discharge of said material, an air bellows secured to said rear wall in generally overlying relation with said discharge channel and adapted to move said lip member, an air flow valve adapted to control movement of said bellows, an upper lever rotatably secuerd to said rear wall and connected to said air bellows for movement with said air bellows, a connecting member having one end secured to said upper lever and a pair of integral depending arms secured to said lip member, and said depending arms diverging downwardly and being rotatably secured to said lip member on opposite sides thereof.

References Cited

UNITED STATES PATENTS

| | | | |
|---|---|---|---|
| 1,468,294 | 9/1923 | Hill | 296—51 |
| 2,212,058 | 8/1940 | Wood. | |
| 2,678,121 | 5/1954 | Phillips | 296—51 X |
| 2,983,548 | 5/1961 | Harbers. | |
| 3,361,476 | 1/1968 | Smock | 298—7 |

RICHARD J. JOHNSON, Primary Examiner